(12) United States Patent
Braun

(10) Patent No.: US 7,017,085 B2
(45) Date of Patent: Mar. 21, 2006

(54) SYSTEMS AND METHODS FOR REMOTE TRACKING OF REBOOT STATUS

(75) Inventor: Richard A. Braun, Mechanicsville, VA (US)

(73) Assignee: Capital One Financial Corporation, McLean, VA (US)

( * ) Notice: Subject to any disclaimer, the term of this patent is extended or adjusted under 35 U.S.C. 154(b) by 402 days.

(21) Appl. No.: 10/159,767

(22) Filed: May 30, 2002

(65) Prior Publication Data

US 2003/0226059 A1    Dec. 4, 2003

(51) Int. Cl.
*G06F 11/00*    (2006.01)

(52) U.S. Cl. .............................. 714/47; 714/24; 714/36; 714/57; 713/2

(58) Field of Classification Search .................. 714/24, 714/26, 57, 47, 36; 713/2; 434/118; 702/179, 702/188
See application file for complete search history.

(56) References Cited

U.S. PATENT DOCUMENTS

| | | | |
|---|---|---|---|
| 5,101,402 A | | 3/1992 | Chiu et al. |
| 5,109,486 A | | 4/1992 | Seymour |
| 5,542,047 A | | 7/1996 | Armstrong |
| 6,018,619 A | | 1/2000 | Allard et al. |
| 6,115,680 A | | 9/2000 | Coffee et al. |
| 6,141,777 A | * | 10/2000 | Cutrell et al. .................. 714/47 |
| 6,178,528 B1 | * | 1/2001 | Poisner ......................... 714/48 |
| 6,189,114 B1 | * | 2/2001 | Orr .............................. 714/25 |
| 6,230,285 B1 | | 5/2001 | Sadowsky et al. |
| 6,446,046 B1 | * | 9/2002 | Gronemeyer et al. ......... 705/28 |
| 6,473,855 B1 | * | 10/2002 | Welder .......................... 713/2 |
| 6,658,585 B1 | * | 12/2003 | Levi ............................. 714/4 |
| 6,697,962 B1 | * | 2/2004 | McCrory et al. ............. 714/27 |
| 6,738,811 B1 | * | 5/2004 | Liang .......................... 709/224 |
| 6,745,343 B1 | * | 6/2004 | Barenys et al. ............... 714/36 |
| 6,757,837 B1 | * | 6/2004 | Platt et al. ...................... 714/4 |
| 2002/0170005 A1 | * | 11/2002 | Hayes .......................... 714/47 |
| 2003/0065986 A1 | * | 4/2003 | Fraenkel et al. ............... 714/47 |
| 2003/0204588 A1 | * | 10/2003 | Peebles et al. ............. 709/224 |
| 2003/0212928 A1 | * | 11/2003 | Srivastava et al. ............ 714/47 |
| 2005/0021311 A1 | * | 1/2005 | Deb et al. .................... 702/188 |

\* cited by examiner

*Primary Examiner*—Robert Beausoliel
*Assistant Examiner*—Christopher McCarthy
(74) *Attorney, Agent, or Firm*—Finnegan, Henderson, Farabow, Garrett & Dunner, LLP

(57) ABSTRACT

Systems and methods consistent with the present invention provide for remote tracking of the reboot status for a plurality of user terminals. Each user terminal runs a start-up routine capable of creating a record of information about the terminal, including reboot status. The record of information is stored in log file on a file server, along with the records of information from other user terminals. A collection routine executed by a central server collects the log files from the file servers and stores the records in a database. Based on the records stored in the database, various status reports may be generated that reflect, among other things, a reboot status associated with the user terminals over a predetermined period of time.

8 Claims, 13 Drawing Sheets

LOG FILE

| User | Context 808 | 810 | CPU 815 | RAM | OS 820 | Template 825 | Computer Name 830 | MAC 835 | Date 842 | Reboot Date 844 | Reboot Time 845 | Flag |
|---|---|---|---|---|---|---|---|---|---|---|---|---|
| LEpps | CRA.KN1.KNO.RIC.COS | | 266 | 64 | Windows95 | 1212.0601.3 | KN13617 | :0008C78CF5B0: | 1/8/2002 | 6:23:26 | AM | 1 |
| dbut3000 | CRA.KN1.KNO.RIC.COS | | 266 | 64 | Windows95 | 1212.0601.3 | KN31640 | :0008C7AAC1D3: | 1/10/2002 | 3:06:35 | PM | 1 |
| RLawrenc | CRA.KN1.KNO.RIC.COS | | 266 | 64 | Windows95 | 1212.0601.3 | KN13381 | :0008C7EA2C0C: | 1/14/2002 | 12:28:55 | PM | 0 |
| LEpps | CRA.KN1.KNO.RIC.COS | | 266 | 64 | Windows95 | 1212.0601.3 | KN13617 | :0008C78CF5B0: | 1/15/2002 | 3:53:23 | AM | 0 |
| dbut3000 | CRA.KN1.KNO.RIC.COS | | 266 | 64 | Windows95 | 1212.0601.3 | KN31640 | :0008C7AAC1D3 | 1/15/2002 | 9:37:50 | AM | 1 |
| RLawrenc | CRA.KN1.KNO.RIC.COS | | 266 | 64 | Windows95 | 1212.0601.3 | KN13381 | :0008C7EA2C0C: | 1/24/2002 | 1:38:25 | PM | 1 |
| dvas4717 | CRA.KN1.KNO.RIC.COS | | 266 | 64 | Windows95 | 1212.0601.3 | KN31316 | :0008C7B28914: | 1/2/2002 | 6:53:02 | AM | 1 |
| QGunn | CRA.KN1.KNO.RIC.COS | | 266 | 96 | Windows95 | 1212.0601.3 | KN31272 | :0008C7B2A5EA: | 1/2/2002 | 9:43:28 | AM | 1 |
| TMatthew | CRA.KN1.KNO.RIC.COS | | 266 | 96 | Windows95 | 1212.0601.3 | KN31635 | :0008C7AAF705: | 1/2/2002 | 10:10:27 | AM | 1 |
| MCro9866 | CRA.KN1.KNO.RIC.COS | | 266 | 96 | Windows95 | 1212.0601.3 | KN31307 | :0008C7BA155C: | 1/2/2002 | 10:28:58 | AM | 0 |
| MCro9866 | CRA.KN1.KNO.RIC.COS | | 266 | 96 | Windows95 | 1212.0601.3 | KN31307 | :0008C7BA155C: | 1/2/2002 | 10:35:33 | AM | 0 |
| BLanzer | CRA.KN1.KNO.RIC.COS | | 266 | 96 | Windows95 | 1212.0601.3 | KN31273 | :0008C7AAC4CC: | 1/3/2002 | 2:53:06 | PM | 0 |
| KCas1748 | CRA.KN1.KNO.RIC.COS | | 266 | 96 | Windows95 | 1212.0601.3 | KN31634 | :0008C7BA154B: | 1/3/2002 | 5:13:59 | PM | 1 |
| CSmi0211 | CRA.KN1.KNO.RIC.COS | | 266 | 96 | Windows95 | 1212.0601.3 | KN31639 | :0008C7BABC7E: | 1/4/2002 | 8:04:48 | AM | 0 |
| SPage | CRA.KN1.KNO.RIC.COS | | 266 | 96 | Windows95 | 1212.0601.3 | KN31271 | :0008C7B293B4: | 1/4/2002 | 1:16:26 | PM | 0 |
| BLanzer | CRA.KN1.KNO.RIC.COS | | 266 | 96 | Windows95 | 1212.0601.3 | KN31273 | :0008C7AAC4CC: | 1/4/2002 | 1:27:50 | PM | 0 |
| FCreasey | CRA.KN1.KNO.RIC.COS | | 266 | 96 | Windows95 | 1212.0601.3 | KN31654 | :0008C7AA9A01: | 1/4/2002 | 1:43:24 | PM | 0 |
| Ikno3518 | CRA.KN1.KNO.RIC.COS | | 266 | 96 | Windows95 | 1212.0601.3 | KN31670 | :0008C7B24AB4: | 1/4/2002 | 2:15:38 | PM | 1 |
| BLanzer | CRA.KN1.KNO.RIC.COS | | 266 | 96 | Windows95 | 1212.0601.3 | KN31273 | :0008C7AAC4CC: | 1/4/2002 | 5:05:08 | PM | 1 |
| PYates | CRA.KN1.KNO.RIC.COS | | 266 | 96 | Windows95 | 1212.0601.3 | KN31621 | :0008C7B241FF: | 1/4/2002 | 5:27:21 | PM | 1 |
| MHar9758 | CRA.KN1.KNO.RIC.COS | | 266 | 96 | Windows95 | 1212.0601.3 | KN31274 | :0008C7BAACBD: | 1/5/2002 | 11:19:06 | AM | 1 |
| CWat0149 | CRA.KN1.KNO.RIC.COS | | 266 | 96 | Windows95 | 1212.0601.3 | KN31650 | :0008C7BA20FD: | 1/5/2002 | 2:07:02 | PM | 1 |
| MCro9866 | CRA.KN1.KNO.RIC.COS | | 266 | 96 | Windows95 | 1212.0601.3 | KN31307 | :0008C7BA155C: | 1/6/2002 | 4:56:16 | PM | 1 |
| CGoldwal | CRA.KN1.KNO.RIC.COS | | 266 | 96 | Windows95 | 1212.0601.3 | KN31270 | :0008C7B265A4: | 1/6/2002 | 5:34:28 | PM | 1 |
| CWat0149 | CRA.KN1.KNO.RIC.COS | | 266 | 96 | Windows95 | 1212.0601.3 | KN31650 | :0008C7BA20FD: | 1/7/2002 | 1:53:18 | PM | 1 |
| ESnead | CRA.KN1.KNO.RIC.COS | | 266 | 96 | Windows95 | 1212.0601.3 | KN31623 | :0008C729BC04: | 1/7/2002 | 2:11:56 | PM | 1 |
| RMuniz | CRA.KN1.KNO.RIC.COS | | 266 | 96 | Windows95 | 1212.0601.3 | KN31624 | :0008C7AA8F39: | 1/7/2002 | 3:59:49 | PM | 0 |
| MRussel | CRA.KN1.KNO.RIC.COS | | 266 | 96 | Windows95 | 1212.0601.3 | KN31607 | :0008C7DAB95A: | 1/7/2002 | 6:14:40 | PM | 0 |
| SPage | CRA.KN1.KNO.RIC.COS | | 266 | 96 | Windows95 | 1212.0601.3 | KN31271 | :0008C7B293B4: | 1/8/2002 | 10:04:09 | AM | 0 |
| BLanzer | CRA.KN1.KNO.RIC.COS | | 266 | 96 | Windows95 | 1212.0601.3 | KN31273 | :0008C7AAC4CC: | 1/8/2002 | 10:19:51 | AM | 0 |
| KGlanvil | CRA.KN1.KNO.RIC.COS | | 266 | 96 | Windows95 | 1212.0601.3 | KN31609 | :0008C7BA20AB: | 1/8/2002 | 3:09:29 | PM | 1 |
| MMaguire | CRA.KN1.KNO.RIC.COS | | 266 | 96 | Windows95 | 1212.0601.3 | KN31305 | :0008C7BABC2D: | 1/8/2002 | 3:21:10 | PM | 1 |
| RLee0086 | CRA.KN1.KNO.RIC.COS | | 266 | 96 | Windows95 | 1212.0601.3 | KN31630 | :0008C7BA22BA: | 1/9/2002 | 1:48:55 | PM | 0 |
| MCro9866 | CRA.KN1.KNO.RIC.COS | | 266 | 96 | Windows95 | 1212.0601.3 | KN31307 | :0008C7BA155C: | 1/9/2002 | 2:24:45 | PM | 0 |
| CTompkin | CRA.KN1.KNO.RIC.COS | | 266 | 96 | Windows95 | 1212.0601.3 | KN31294 | :0008C7BA20A8: | 1/9/2002 | 4:00:17 | PM | 1 |

REBOOT SUMMARY REPORT

| | JUNE | JULY | AUGUST | SEPTEMBER | OCTOBER |
|---|---|---|---|---|---|
| Total Terminals ~910 | 3,309 | 3,447 | 2,993 | 2,990 | 3,106 |
| Total Crashes & Reboots ~920 | 7,326 | 7,463 | 7,851 | 7,921 | 7,984 |
| Total Crashes ~930 | 2,582 | 2,644 | 2,153 | 1,849 | 2,403 |
| Total Normal Reboots ~940 | 4,744 | 4,819 | 5,698 | 6,072 | 5,581 |
| Total % of Normal Reboots ~950 | 64.76% | 64.57% | 72.58% | 76.66% | 69.90% |
| Total % of Crashes ~960 | 35.24% | 35.43% | 27.42% | 23.34% | 30.10% |
| Totals | | | | | |

Pre and Post Experience Reboots & Trouble Tickets

Reboot Time (min.) 10
Trouble Ticket Time (min.) 20
CR $ Per Hour $ 15

Serv. Ctr $ Per Hour $ 26

1200

|  | 5/01/01 - 5/31/01 | 12/01/01 - 12/31/01 | 1/01/01 - 1/31/01 | Difference between May and Current Month | % Difference between May and Current Month | Pre % of Users | Post % of Users |
|---|---|---|---|---|---|---|---|
| Affected Users | 3755 | 3059 | 3,192 | 563 | 15% |  |  |
| Reboots | 6489 | 1754 | 1,258 | 5,231 | 81% | 173% | 39% |
| Cost of Reboots | $ 16,223 | $ 4,385 | $ 3,145 | $ 13,078 | 81% | 432% | 99% |
| Trouble Tickets | 5029 | 2634 | 2189 | 2840 | 56% | 134% | 69% |
| Cost of Trouble Tickets | $ 43,585 | $ 22,828 | $ 18,971 | $ 24,613 |  |  |  |
| Cost of Reboots and Trouble Tickets | $ 59,807 | $ 27,213 | $ 22,116 | $ 37,691 |  |  |  |
|  |  | Annualized Savings |  | $ 146,827 |  |  |  |

FIG. 12

SYSTEMS AND METHODS FOR REMOTE TRACKING OF REBOOT STATUS

BACKGROUND OF THE INVENTION

1. Field of the Invention

The present invention relates generally to the field of computer operating systems and more particularly to methods and systems for the remote tracking of reboot status of components in a distributed system.

2. Background and Material Information

Computer operating systems operate generally to control and manage the resources of a computer system. Typically, an operating system begins execution upon a power-on or start-up of the computer system by a sequence of events known as bootstrapping or booting. The operating system is started or "booted" by executing a portion of code commonly referred to as boot code.

Once the operating system is properly booted, the computer system may begin normal operations. During these operations, the computer system may experience an event that causes an interrupt to the system. Various forms of events may cause the system interrupt, such as a shut down event (e.g., the user directing the shut down of the computer) or computer crash event. During a shut down event, the operating system receives a shut down command, which directs the computer system to perform standard shutdown procedures that may result in a reboot of the operating system. A crash event may occur when the operating system does not receive the shutdown command following a shut down event.

To aid in prevention and/or recovery efforts associated with shut down and crash events, conventional computer systems employ reporting tools that may log information associated with the detected shut down or crash events. These reporting tools may provide local "health" reports that indicate, among other things, the type of event detected (e.g., shut down and/or crash event). Although these tools provide information that may aid in the analysis, and perhaps recovery, of such events, their use is restricted to the local system that runs the tool. For example, in a distributed computing environment including a plurality of computer systems, each system may run a reporting tool that provides error and/or fault status information associated with their respective system.

Currently, there are no systems that collect information associated with reboot, shut down, and/or crash events at a centralized remote location. Therefore, managers of such distributed environments may find it difficult to track the status and ramifications of localized shut down or crash events. In some instances, the manager may be required to visit each local computer system to collect a corresponding health report. Accordingly, there is a need for methods and systems that allows computer system health reports to be provided to a centralized location in a distributed computing environment.

SUMMARY OF THE INVENTION

Systems and methods consistent with the present invention provide for remote tracking of the reboot status for a plurality of user terminals. Each user terminal runs a start-up routine capable of creating a record of information about the terminal, including reboot status. The record of information is stored in log file on a file server, along with the records of information from other user terminals. A collection routine on a central server collects the log files from the file servers and stores the records from the log files in a database. Based on the records stored in the database, various status reports may be generated that reflect, among other things, a reboot status associated with the user terminals over a predetermined period of time.

BRIEF DESCRIPTION OF THE DRAWINGS

The accompanying drawings provide a further understanding of the invention and, together with the detailed description, explain the principles of the invention. In the drawings:

FIG. 8 is a diagram of an exemplary log file consistent with certain features related to the present invention;

FIGS. 9–13 are exemplary reports consistent with certain features related to the present invention;

DETAILED DESCRIPTION

Figure 1:
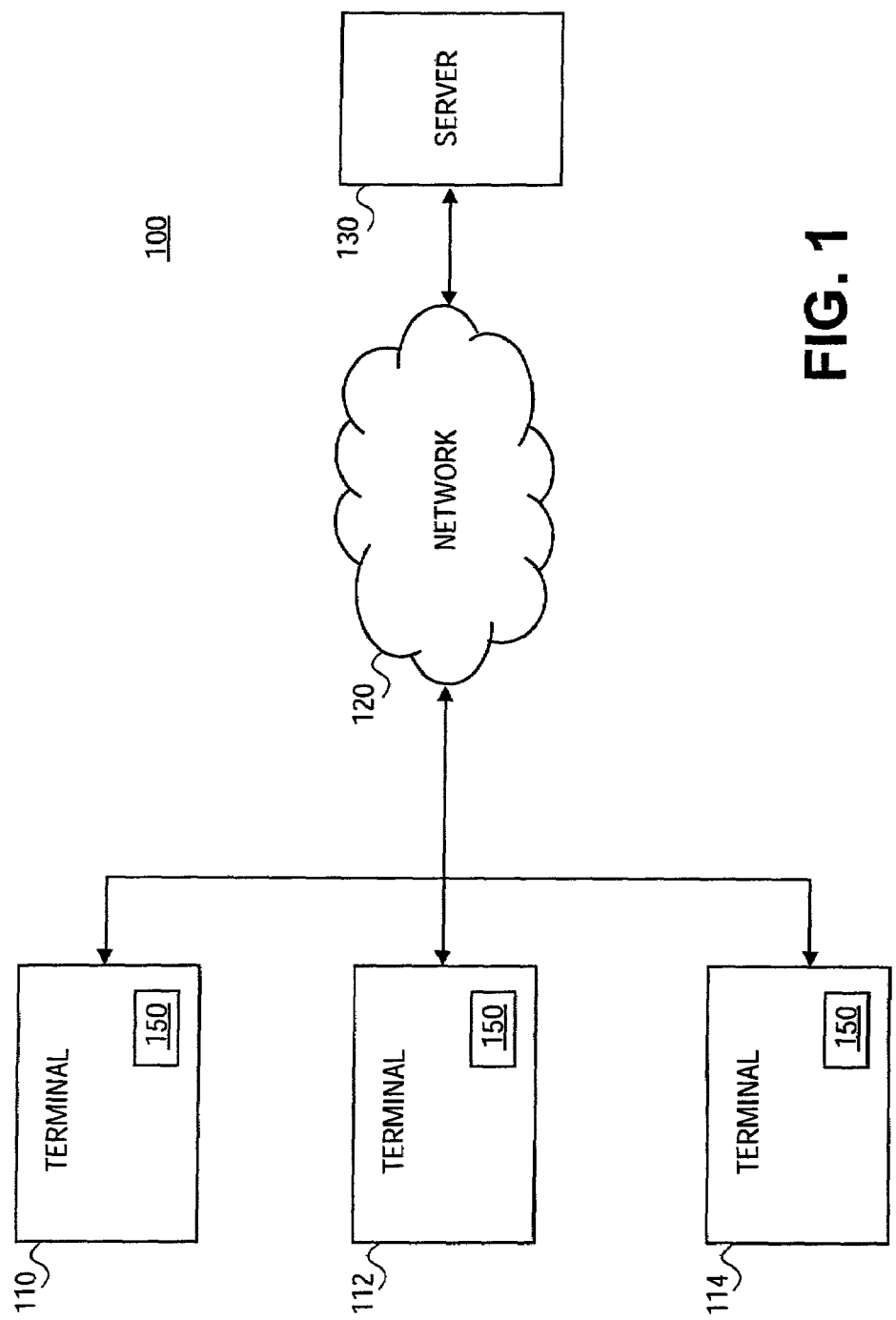
FIG. 1 is a diagram of an exemplary network environment in which certain features and aspects of the present invention may be implemented.

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Methods and systems consistent with certain principles related to the invention provide a reboot tracking system for the generation of reports in a distributed computing environment including a plurality of user terminals that are connected to a server system. Each user terminal runs a start-up routine when the terminal is started. The start-up routine determines the information needed to create a record that is a listing of information associated with the respective user terminal. For example, the record may include a flag indicating whether the user terminal crashed. The start-up routine may also start an application that monitors the user terminal for a "Shut Down" command that, if received, indicates a proper shutdown by the user terminal. In one embodiment of the present invention, records from a number of terminals in the distributed computing environment are stored in a data file associated with a file server. The user terminals may periodically update the data file, which may be located on the file server. A collection routine at a central server collects information in the data file from the file servers and stores the information in a database on the central server. The database on the central server is then used to generate reports that indicate, among other things, the reboot status of the user terminal.

The above-noted features and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and aspects of these processes may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

Embodiments of the present invention also relate to computer readable media that include program instructions or program code for performing various computer-implemented operations based on the methods and processes of the invention. The program instructions may be those specially designed and constructed for the purposes of the invention, or they may be of the kind well known and available to those having skill in the computer software arts. Examples of program instructions include for example machine code, such as produced by a compiler, and files containing a high level code that can be executed by the computer using an interpreter.

Embodiments of the present invention will now be described with reference to the accompanying drawings. FIG. 1 shows a block diagram of an exemplary system 100 consistent with the present invention. As shown in FIG. 1, system 100 includes terminals 110, 112, and 114 connected to a server 130 over a network 120. Network 120 may be any type of network that facilitates the exchange of data between terminals 110, 112, 114, and server 130. For example, network 120 may be a local area network (LAN), a wide area network (WAN), a dedicated intranet, the Internet, and/or a wireless network. Further, while FIG. 1 shows only one server 130 and three terminals, one skilled in the art would recognize that any number of servers and/or terminals may be implemented in system 100 without departing from the scope of the present invention.

Terminals 110, 112, and 114 may represent any type of computer system, such as a personal desktop computer, laptop computer, Personal Digital Assistant (PDA), etc. Terminals 110–114 may include computing components (not shown), such as processors, memory devices and input/output interface devices that provide a connection to network 120. Further, terminals 110, 112, and 114 may perform various processes, when executed by a processor, including start-up routine 150 that generates information for a record on start-up of a respective terminal 110, 112, and 114.

Figure 2:
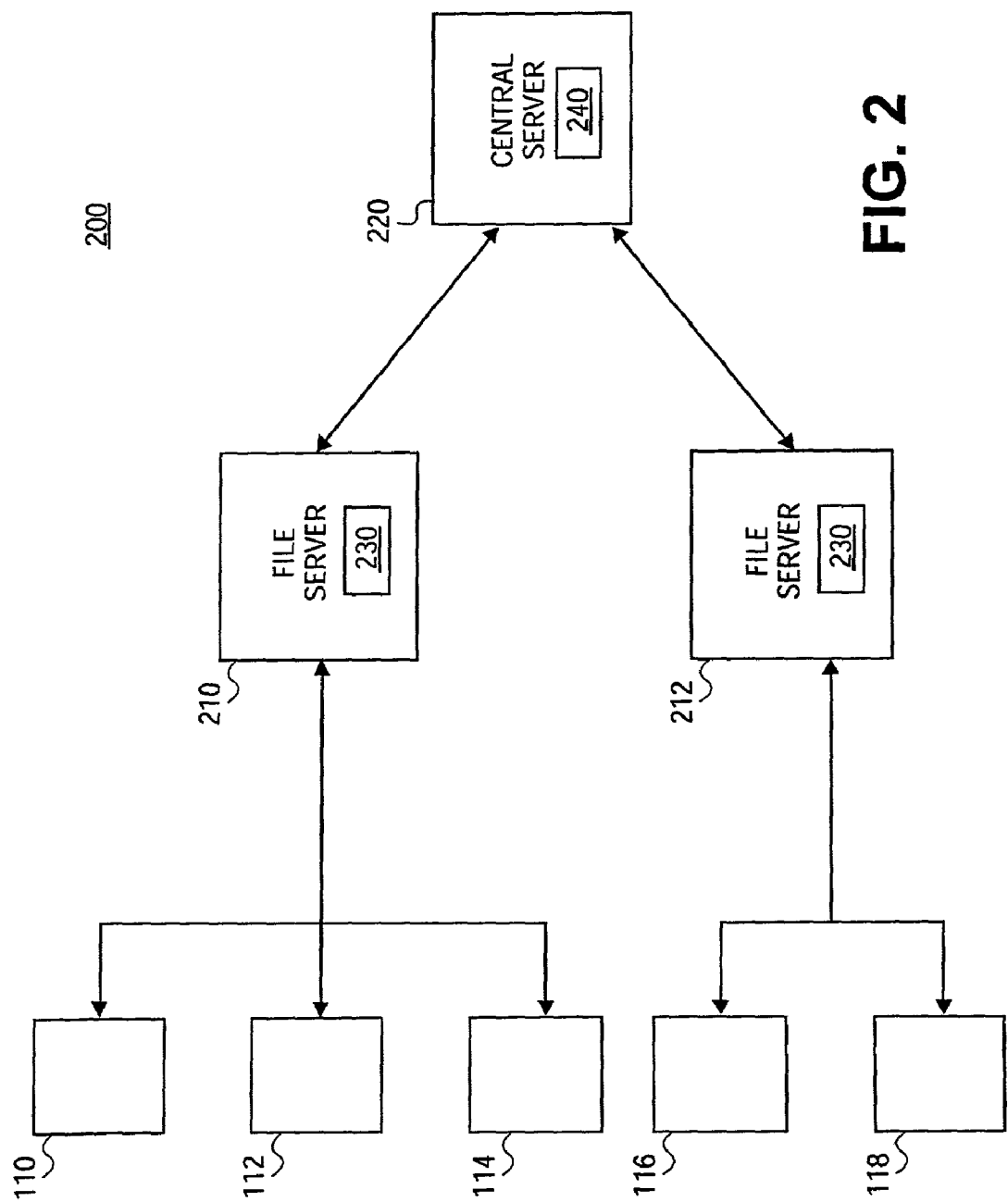
FIG. 2 is a diagram of an another exemplary network environment in which certain features and aspects of the present invention may be implemented.

FIG. 2 shows a block diagram of an exemplary system 200 consistent with another embodiment of the present invention. As shown in FIG. 2, system 200 includes terminals 110, 112, and 114 connected to file server 210 and terminals 116 and 118 connected to a file server 212. File servers 210 and 212 are each connected to central server 220. File servers 210, 212 and central server 220 may each be any type of computer system that is configured to perform one or more processes consistent with certain features of the present invention. For example, servers 210 and 220 may be a computer system that executes server and client-based applications that allow data to be exchanged with user terminals 110–118 and central server 220. While FIG. 2 shows only two file servers and five user terminals 110–118, any number of file servers and/or user terminals may be implemented in system 200 without departing from the scope of the present invention. For example, in one embodiment of the invention, system 200 may include 2,400 user terminals, 70 file servers, and one central server. Further, each file server 210 and 212 may be connected to up to approximately 1200 terminals. Also, terminals 110–118 may each include and execute start up routines 150 (not shown).

File servers 210 and 212 may include a log file 230 that is a file that stores records received from terminals 110–118. Log file 230 may be located in one or more memory devices (not shown) associated with a respective file server 210, 212. Further, central server 220 may execute a collection program 240 that collects data from log file 230, including the records provided by terminals 110–118, and stores the collected data in one or more memory devices (not shown).

Figure 3:
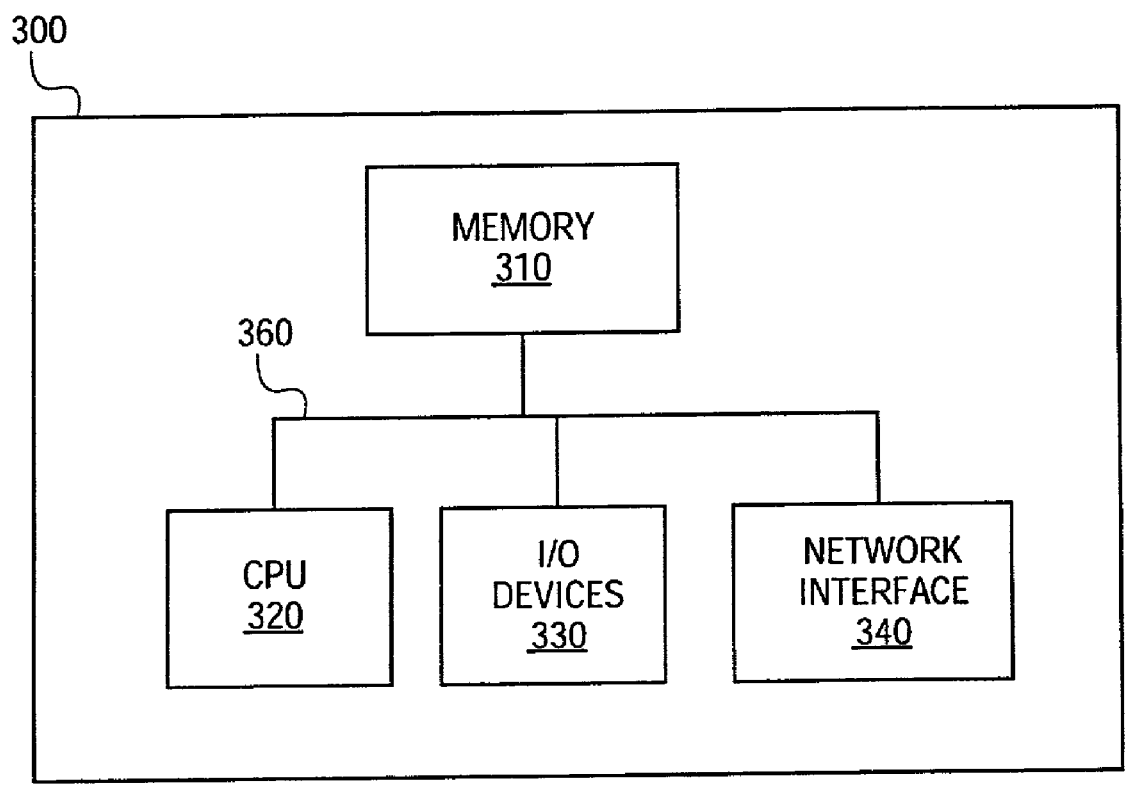
FIG. 3 is a block diagram of an exemplary computer system in which methods and systems consistent with certain aspects related to the present invention may be implemented.

FIG. 3 is a block diagram of an exemplary computer system 300 in which methods and systems consistent with the invention may be implemented. Computer system 300 may represent the internal components of the terminals 110–114 and server 130 included in exemplary system architecture 100. Further, system 300 may represent the internal components of terminals 110–118 and servers 210, 212, and 220 included in exemplary system architecture 200. As shown, computer system 300 includes memory 310, Central Processing Unit (CPU) 320, I/O devices 330, and network interface 340 that are all interconnected via a system bus 360.

Memory 310 may be any type of memory device that stores data, instructions, programs, and other form of information that may be used by system 300 and/or systems external to system 300. For example, memory 310 may include a random access memory (RAM), a read-only memory (ROM), a video memory, or mass storage. Further, memory 310 may contain an operating system, an application routine, a program, an application programming interface (API), and other instructions for performing the methods consistent with certain aspects related to the invention.

CPU 320 may be a processing unit that uses data and/or executes instructions stored in memory 310. CPU 320 may be any type of processing device that is configured to perform processes consistent with certain features related to the present invention. For example, CPU 320 may be a microprocessor from the Pentium® family of microprocessors manufactured by Intel Corporation.

Input/output (I/O) devices 330 may be any type of I/O device(s) that allows system 300 to receive and provide information from/to systems or components internal or external to system 300. For example, I/O devices 330 may include a keyboard, pointing device, or other like input devices that allows system 300 to receive data from a user. Further, I/O devices 330 may include a display device that presents information to a user.

Network interface 340 may be any type of interface device that allows system 300 to communicate with computing systems or components external to system 300, via network 120. System bus 360 may be any type of bus configured in any type of configuration that allows data to be exchanged between the components of system 300. For example, system bus 360 may be a bi-directional system bus, containing thirty-two bit address lines for addressing a memory 310 and thirty-two bit data lines across which data is transferred among the components. Alternatively, multiplexed data/address lines may be used instead of separate data and address lines. One skilled in the art would recognize that any type of system bus may be employed by system 300 without departing from the scope of the invention.

Figure 4:
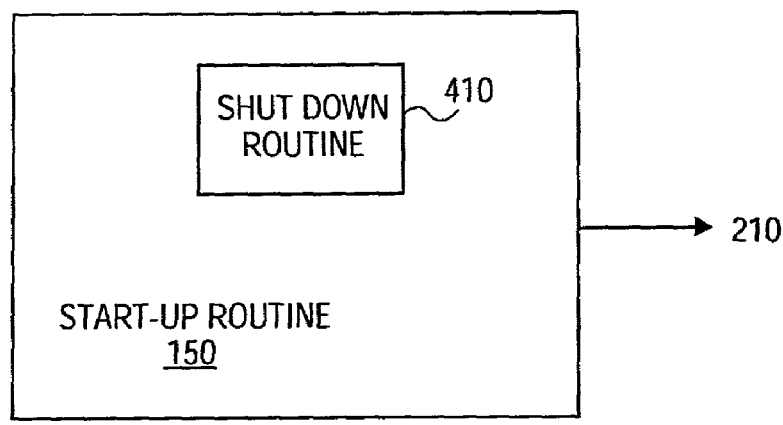
FIG. 4 is a diagram of an exemplary start-up routine consistent with certain features related to the present invention.

FIG. 4 shows a block diagram of an exemplary start-up routine consistent with certain features of the present invention. Start-up routine 150 may be a program located in memory 310 and executed by CPU 320 when a respective terminal (e.g., 110–114 in FIG. 1 or 110–118 in FIG. 2) is started. In one embodiment of the invention, start-up routine 150 determines an identity of a user that has started a respective terminal 110–118 and logged into a local or remote environment (e.g., a local application or a remote application provided by a server). Further, start-up routine 150 may determine a time stamp associated with the user login. In one embodiment, startup routine 150 may perform a process that compares current user identity information with logged user identity information associated with previous logins at the respective terminal 110–118. Based on the comparison routine 150 may determine whether the same user logged in more than once during a predetermined range of time, such as a consecutive 8 hour period.

Further, routine 150 may collect status and/or state information associated with the respective terminal 110–118 executing the routine 150. The status information may include reboot and/or crash information. Reboot information may be associated with the status of the respective terminal 110–118 during a boot-up or reboot procedure. For example, reboot information may include data reflecting whether the terminal experienced a hard or soft shut down event that caused the system to reboot.

Crash information may reflect status and/or state information associated with a crash of the respective terminal. Further, start-up routine 150 may include a shut down routine 410 that monitors an operating system running in the respective terminal 110–118 to determine whether it has received a "Shut Down" command. During a shut down event, the operating system is configured to receive a shut down command from shut down processes operating within terminal 110–118. When a shut down command is received by the operating system, shut down routine 410 may designate the computer as having shutdown normally.

Figure 7:
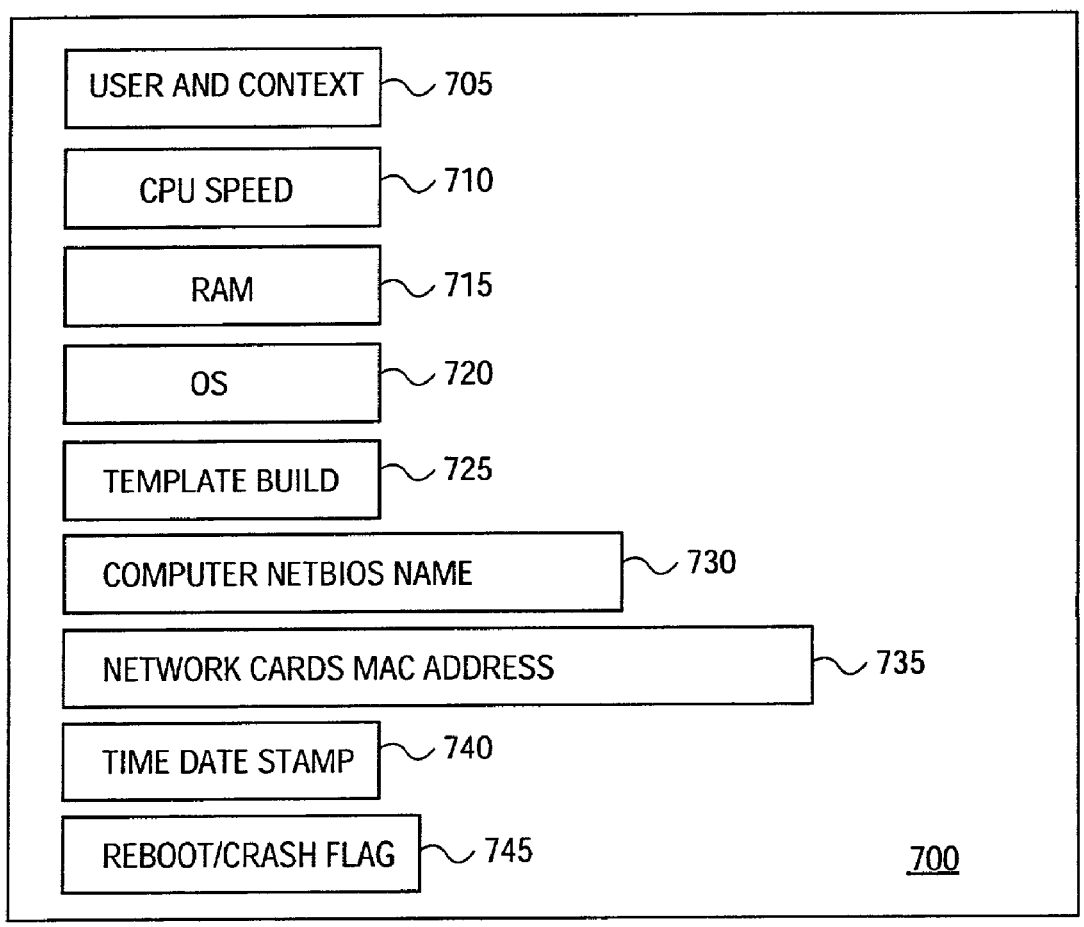
FIG. 7 is a diagram of an exemplary record consistent with certain features related to the present invention.

Start-up routine 150 may gather the status and state information associated with the respective terminal 110–118 executing the routine and generate a record. A record may be a file that includes the collected state and status information. Start-up routine 150 may provide the generated record to a file server, such as file server 210 or 212. FIG. 7 shows a diagram of an exemplary record consistent with an embodiment of the present invention. As shown, record 700 includes the fields of "user and context" 705, CPU speed 710, RAM 715, OS 720, Template Build 725, Computer NetBios name 730, Network cards MAC Address 735, Time and Date stamp 740 and Reboot/Crash Flag 745. The information that is collected is designed to gather the data needed to create reports on terminal and system health.

"User and context" 705 is a Network Login name and the organizational unit of the user operating terminal 110–118. This information may be used by system architectures 100 and 200 to identify terminals and/or their operators. For example, field 705 may be used by, for example, support personnel for identifying individual terminals and/or operators that are experiencing various shut down and crash event trends. Further, the context of a user may be used to indicate if terminals associated with one organizational unit are restarting more frequently than terminals associated with other organizational units.

CPU 710 is the processor speed of the terminal. This information can be used for trending, such as determining if one CPU reboots more than another. RAM 715 may reflect one or more memory devices installed in the terminal and may also be used for trending. For example, a user may identify from a plurality of records 700 whether one type of memory device (e.g., size, manufacturer, etc.) are present in terminals that show a tendency of experiencing more reboots than other memory devices. For example, support personnel may justify upgrading the memory devices installed in the terminals of an organizational unit based on an identification of the type of memory device identified by field 715 in records 700 provided by the terminals in that organizational unit.

OS 720 is the operating system installed in the terminal 110–118. OS field 720 may be used by system architectures 100 and 200 to identify trends associated with the operating systems included in the terminals operating in the respective distributed systems. For example, users may use field 720 to identify trends associated with terminals that experience shut down and/or crash events. For instance, based on the OS filed from a plurality of records 700 provided by terminals 110–118, a user (or a program executed by a processor) may determine that a particular type of operating system is installed on terminals that have experienced a pattern of abnormal shut downs. This information may be used to justify upgrades or changes in these operating systems.

Template 725 is the "build" number of the image file used on the terminal.

The image file contains everything to be installed on a terminal, such as the operating system and all of the software. The image file is used to "build" or replicate the system on a set of terminals. Each terminal for which a specific image was used will have an identical system. Template 725 indicates which version of an image file is used. Template 725 may be used be users (or programs executed by a processor) to identify problems with specific image files. For example, if one version is crashing significantly more than another in the same organizational unit, this may indicate a problem with the template.

Name 730 is the Net Bios name of the terminal. Name 730 may be used to track a terminal that is experiencing problems, such as abnormal operations. A user, such as a technician, may use this tracking information to identify the terminal, as well as correlate the identified problem with a trouble ticket. A trouble ticket is a representation, such as a job request, used by support personnel to identify and track problems associated with various components in system architectures 100, 200, including terminals 110–118.

Mac 735 is a unique network address that is burned into the network card. This field may be used by a user (or program executed by a process) to identify terminals for use in reports generated by central server 220. Date and Time 740 reflects the date and time terminal 110–118 generated the record 700.

Flag 745 may be an indicator of whether the terminal restarted normally or crashed the last time it was shut down. In one embodiment of the present invention, a "0" indicates a Crash (an abnormal shutdown) and "1" indicates that the terminal shutdown normally. Different types of flags, such as various bit sizes, coded information, etc., may be implemented without departing from the scope of the invention. Further, one skilled in the art would recognize that the fields included in record 700 is not intended to be limiting and additional or fewer fields may be generated and included in record 700 without departing from the scope of the present invention.

Figure 5:
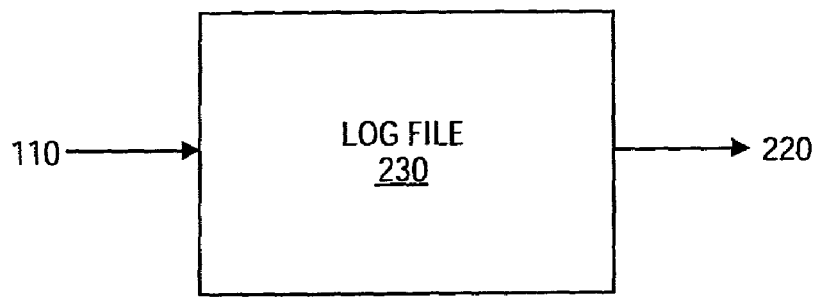
FIG. 5 is a diagram of an exemplary log file consistent with certain features related to the present invention.

FIG. 5 is a diagram of an exemplary log file 230 consistent with certain features related to the present invention. Log file 230 may include data reflecting the records generated and provided by terminals 110–118. For example, file server 210 may receive (or collect) the records 700 generated by the start-up routine 150 operating in terminals 110–114. The received records may be stored collectively in log file 230 maintained by file server 210. In one embodiment, file servers 210, 220 may maintain the records stored in each log file 230 until central server 220 requests the file.

Alternatively, file servers 210, 220 may provide the data included in each log file 230 to central server 220 autonomously. For instance, file server 210 may be configured to push a log file 230 to central server 220 periodically, such as very 8 hours.

FIG. 8 shows a diagram of an exemplary log file 800 that may be generated and maintained by file servers 210, 220 consistent with an embodiment of the present invention. As shown, exemplary log file 800 may include records from a number of different terminals, such as terminals 110–118. For example, if file server 210 maintained log file 800, the log file 800 may include records received from terminals 110–114. Further, if file server 212 maintained log file 800, the log file 800 may include records received from terminals 116 and 118.

In one embodiment, each entry (e.g., row) in log file 800 may include corresponding entries (e.g., columns) associated with the fields included in record 700. For example, log file 800 includes record information corresponding to a plurality of users identified by user column 802 (e.g., "LEpps") and taken from "user and context" 705 in a record 700 (FIG. 7). Context 808 may include information that corresponds to the "user and context" 705 for each identified user (e.g., the context for LEpps is "CRA.KN1.KNO.RIC.COS"). CPU column 810 may correspond to the CPU speed field 710 included in record 700 (e.g., CPU speed of "266" for user LEpps' terminal). RAM column 815 may include information corresponding to the RAM field 715 in record 700 (e.g., RAM="64" for user LEpps' terminal). OS column 820 may include information corresponding to the OS field 720 in record 700, which indicates the type of operating system executing in a respective user terminal (e.g., user LEpps' terminal is running the "Windows95" operating system provided by Microsoft®).

Template column 825 includes information that corresponds to the template build field 725 in record 700, while Computer Name column 830 may include information corresponding to the computer NetBios name field 730 in record 700 (e.g., the NetBios Name of LEpps' terminal is "KN13617"). MAC column 835 in network cards MAC address field 735 in record 700 (e.g., the Network Cards MAC Address of LEpps' terminal is ":0008C78CF5B0"). Date column 842 includes information corresponding to the time date stamp field 740 in record 700 (e.g., LEpps' terminal created its corresponding record on the date of "Jan. 8, 2002"). Reboot time column 844 includes information that indicates a time when a terminal had to be rebooted (e.g., LEpps' terminal was rebooted at "6:23:26 AM").

Last, flag column 845 includes information corresponding to the reboot crash flag field 745 in record 700. Flag 845 indicates whether a corresponding terminal experienced a crash. For example, a flag setting of "0" may indicate that the terminal experienced a crash event, while a flag setting of "1" may indicate that the terminal did not experience a crash event (e.g., normal shutdown). One skilled in the art would recognize that the information included in log file 800 may include different types of information associated with the status and state of a terminal. Accordingly, log file 800 is not limited to the information included in record 700 and may be supplemented or complimented with other status information. Moreover, the format of exemplary log file 800 is not limited to that shown in FIG. 8. One skilled in the art would recognize that any type of configuration and/or format of the information included in log file 800 may be implemented without departing from the scope of the present invention.

The information in the log file can be used to generate reports; spot trends in system health; and determine training, performance and application issues.

Figure 6:
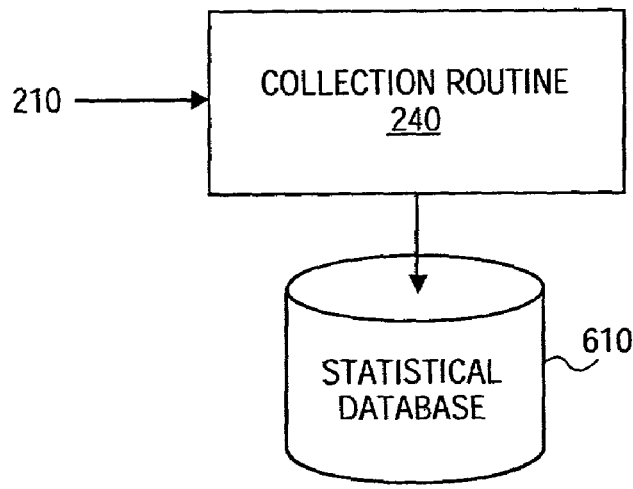
FIG. 6 is a diagram of an exemplary collection routine consistent with certain features related to the present invention.

As previously described, in one embodiment, file servers 210, 212 may maintain the record information in log file 230 until requested by central server 220. FIG. 6 is a diagram of an exemplary configuration included in central server 220 consistent with certain features related to the present invention. As shown, collection routine 240 may be a process executed by central server 220 in a manner consistent with the present invention and exchanges information with a statistical database 610. Statistical database may be a memory device that stores information provided by collection routine 240 and provides data to processing elements and/or processes executing central server 220 to produce reports. In one embodiment, central server 220 may execute collection routine 240 to retrieve log files 230 from file servers 210 and 220. Routine 240 may direct processing elements operating with server 220 to issue a request to file servers 210 and 220 for a log file. In response to the request, servers 210 and 220 may provide the log files 230 to server 220 where routine 240 directs server 220 to store the files in statistical database 610. Central server 240 may use the information stored in database 610 to generate various types of reports associated with the operations of terminals 110–118.

FIGS. 9–13 show exemplary reports that may be created by central server 220 consistent with certain embodiments of the present invention. The reports generated by server 220 may provide to a user operating server 220 or to processes executed at, or remote to, server 220. One skilled in the art would recognize that exemplary reports may be generated on different servers then server 220 without departing from the scope of the invention.

Several types of reports may be generated. Some reports may be focused on individual terminals and users, while other reports may focus on the overall system. For example, the MAC field 835 may be used to key reports to specific terminals, because the value of MAC field 835 is unique to a single terminal. This field can also be used to identify and count the number of terminals operating in a distributed environment (e.g. architecture 200) for use in reports generated by central server 220.

Server 220 may generate a report using a variety of different configurations, processes, and modelling tools. For example, in one embodiment, server 220 may generate a report using a combination of a user interface front end, such as a Visual Basic front end (e.g. SnapShot) and a statistical modelling and database tool, such as Excel by Microsoft®. One skilled in the art would recognize that the reports could be generated with any number of front ends, statistical modelling tools, and database tools without departing from the scope of the present invention. The statistical modelling and database tool may be used generate reports based on selected criteria predetermined by a user. The statistical modeling and database tool may be a database management system (DBMS), which is a collection of programs enabling the storage, modification, and extraction of information from a database.

Server 220 may generate reports that are specific to a variety of different predetermined criteria. For example, server 220 may be configured to generate a report that identifies one or more users that may have training or performance issues. Server may generate this type of report by running a database tool identify the average number of crashes each terminal experiences in a given period of time, such as a month. The database tool may then sum the number of crashes for each terminal and generate a report that identify terminals that show a trend of experiences an above average number of crashes The crash trends of terminals 110–118 may be provided in a report that may be used by a user (or a program executed by a processor) associated with central server 220 to target specific terminals for monitoring. For example, server 220 may initiate a target monitoring process that monitors terminals that have an above average crash rate for subsequent shut down and/or crash events. A trend of an above average number of shut down and/or crash events on a healthy terminal may reflect an inadequately trained individual operating that terminal.

Accordingly, server 220 may utilize the information provided in the records 700 provided by terminals 110–118 to generate reports that may reflect various trends.

For example, server 220 may generate a trend report for one or more terminals that experienced a certain number of crashes over a predetermined period of time. The trend report may be based on various terminal information, such as CPU, RAM, OS and Template Build, and can be summed to create a representation that reflects an overview of which types of terminals are particularly prone to problems. Trend reports may be used by system architectures 100, 200 to justify upgrades or highlight problems with certain types of terminals or other components. For example, a graphical-based trend report may identify particular terminals or organizations that are crashing more than other terminals and/or organizations. One skilled in the art would realize that a variety of different types of reports may be generated by server 220, such as summary and cost reports, without departing from the scope of the present invention.

FIG. 9 is an illustration of a Reboot Summary Report 900 that includes information associated with crash and/or shut down event data. For example, reboot summary report 900 may be configured to include data reflecting the total number terminals that were running during a given period of time. As shown in FIG. 9, field 910 shows the number of terminals that were determined to be operating during the months of June through October. Further, report 900 may include information reflecting total crashes & reboots 920, total crashes 930, total normal reboots 940, total percent of normal reboots 950, and total percent of crashes 960. Although report 900 includes information associated with monthly intervals, one skilled in the art would recognize that different intervals may be included in the report, such as hourly, daily, weekly, etc., without departing from the scope of the invention.

Figure 10:
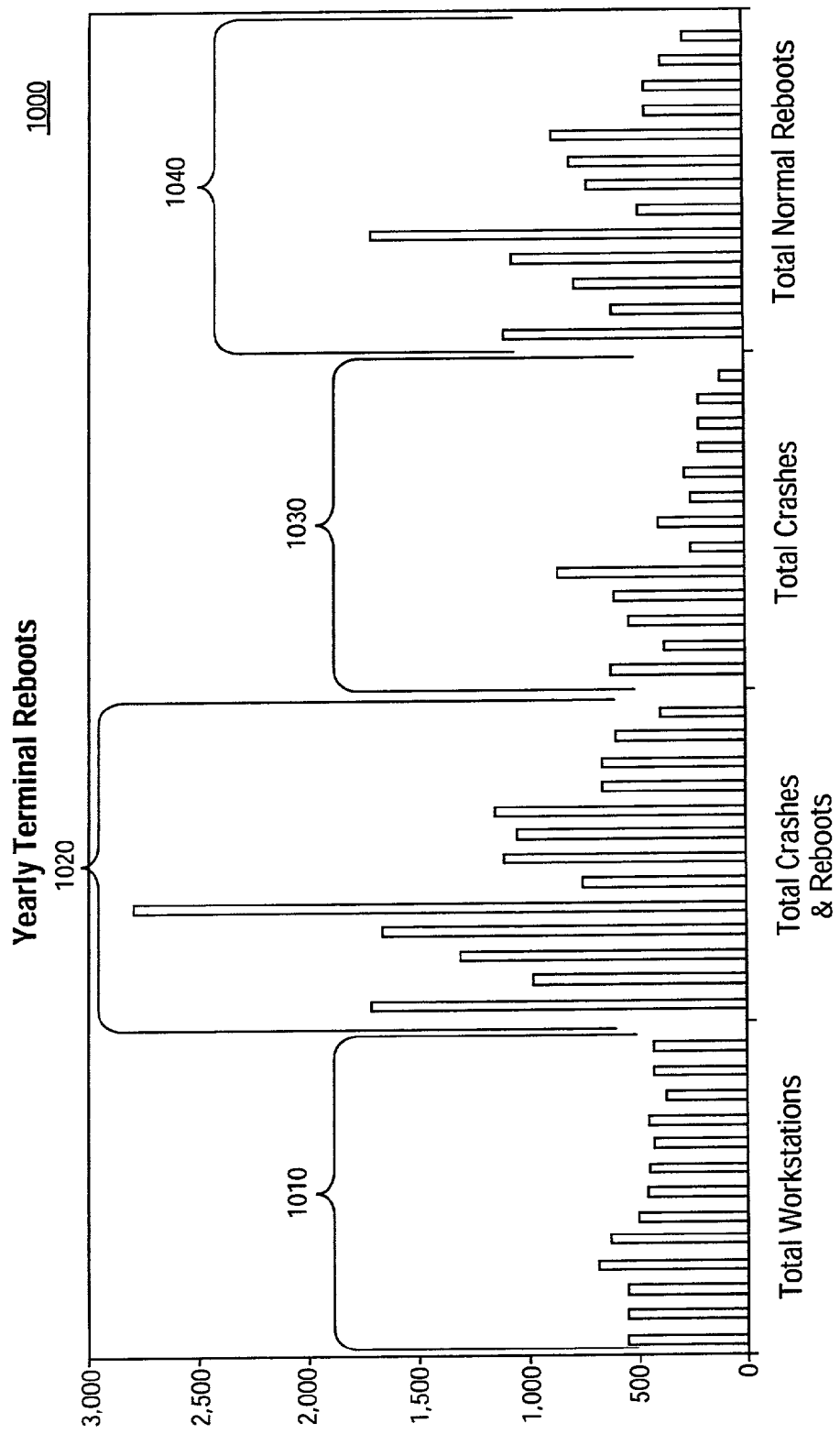

FIG. 10 is an illustration of an exemplary Yearly Terminal Reboots report 1000 corresponding to the information contained in Reboot Summary Report 900. As shown, report 1000 may include various bar graphs corresponding to a portion of the fields in report 900. For example, section 1010 illustrates a bar graph segment that graphically shows the total number of workstations (e.g., terminals) that were operating in the distributed system monitored by central server 220. In one embodiment, server 220 may generate a report after every login event that follows a restart event (crash or normal). Section 1020 illustrates a bar graph segment reflecting the total number of crashes and normal reboots a distributed system (e.g., 100, 200) experienced for a selected number of months in a year. Section 1030 illustrates a bar graph segment reflecting the total number of crashes the distributed system experienced during the selected months, and section 1040 illustrates a bar graph segment reflecting the total number of normal reboots the distributed system detected.

Figure 11:
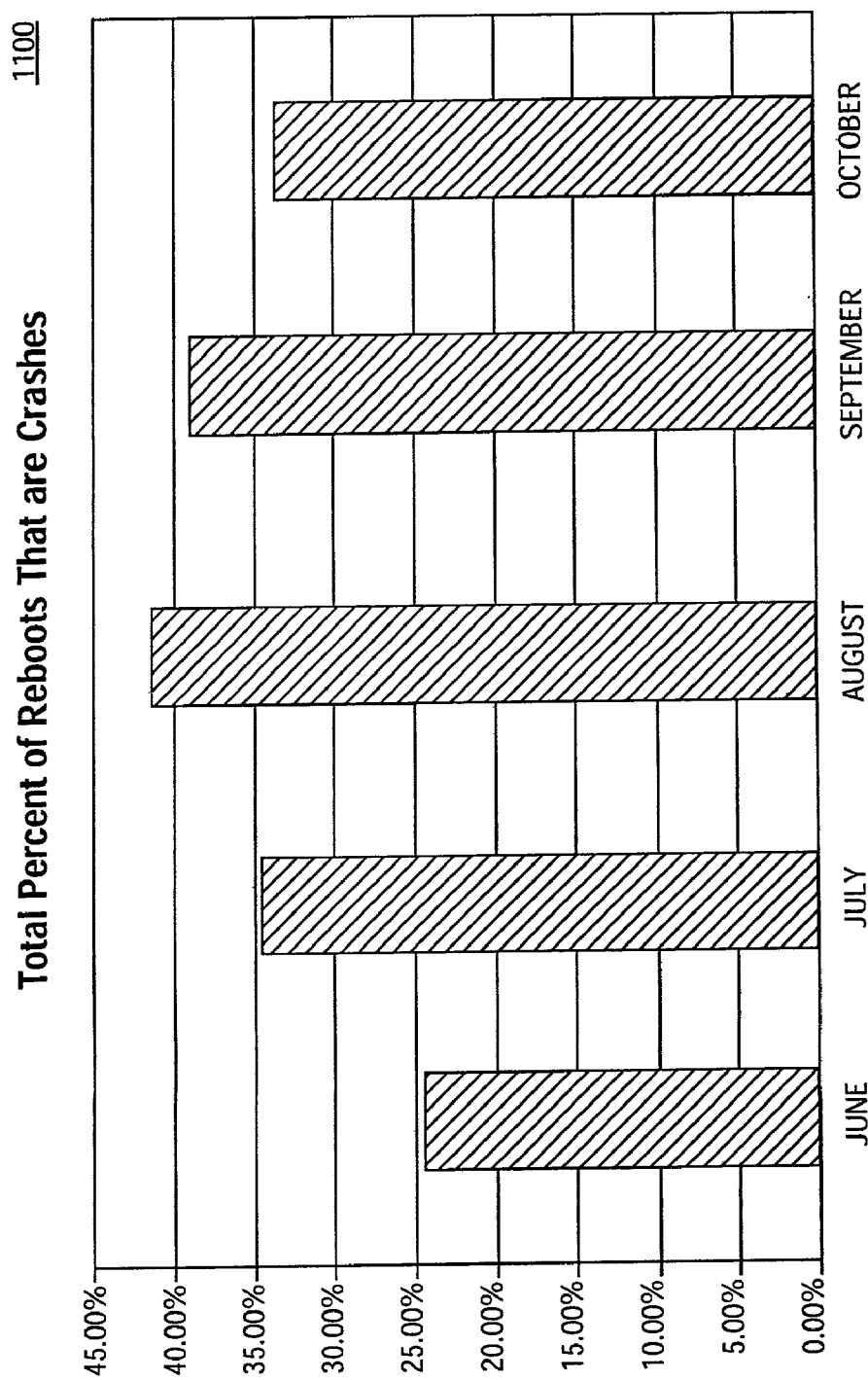

FIG. 11 is an illustration of an exemplary Total Percent of Reboots That are Crashes report 1100 that indicates the percent of reboots that were crashes in a given month. For example, report 1100 shows a percentage of all restarts, or login events that followed a detected crash event. For instance, each bar segment in report 1100 may be determined by server 220 by summing the total number of detected crash events divided by the total number of reboots and crashes in a given month. Accordingly, a user (or program executed by a processor) associated with server 220 may use report 1100 to identify crash trends, such as a downward trend in crashes.

FIG. 12 is an illustration of a data report, Pre and Post Experience Reboots and Trouble Tickets report 1200. Trouble tickets are generated when a user operating terminal 110–118 contacts support personnel to report a problem with their terminal. Trouble tickets may be generated by the support personnel to correlate the reported problem with the terminal and to initiate problem solving tasks by the personnel and/or automated processes executed in architecture 100, 200. By allowing server 220 to actively monitor shut down and crash events, architecture 100, 200 may autonomously generate trouble tickets and sometimes correct problems without the services of a technician at the faulty terminal site. Accordingly, methods and systems consistent with certain principles related to the present invention may enable a distributed system to reduce the costs associated with servicing problem terminals. The cost savings may be reflected by the reduction in down time associated with crashed terminals and not having to send a technician to correct a problem identified on a generated trouble ticket. For example, report 1200 shows a plurality of cost values associated with reboot events and corresponding trouble ticket processing. As can be seen in FIG. 12, proactively monitoring reboots allows a distributed system to take action to correct identified problems, which may lead to reduced operating costs. For example, identifying trends in inadequate training of users of terminals 110–118, architecture 100, 200 may initiate training problems that reduce the number of user-caused crashes, thus reducing the loss of revenue due to user down time. For instance, report 1200 shows that a distributed system that implemented methods and systems consistent with certain features related to the present invention saved $146,827.

Figure 13:
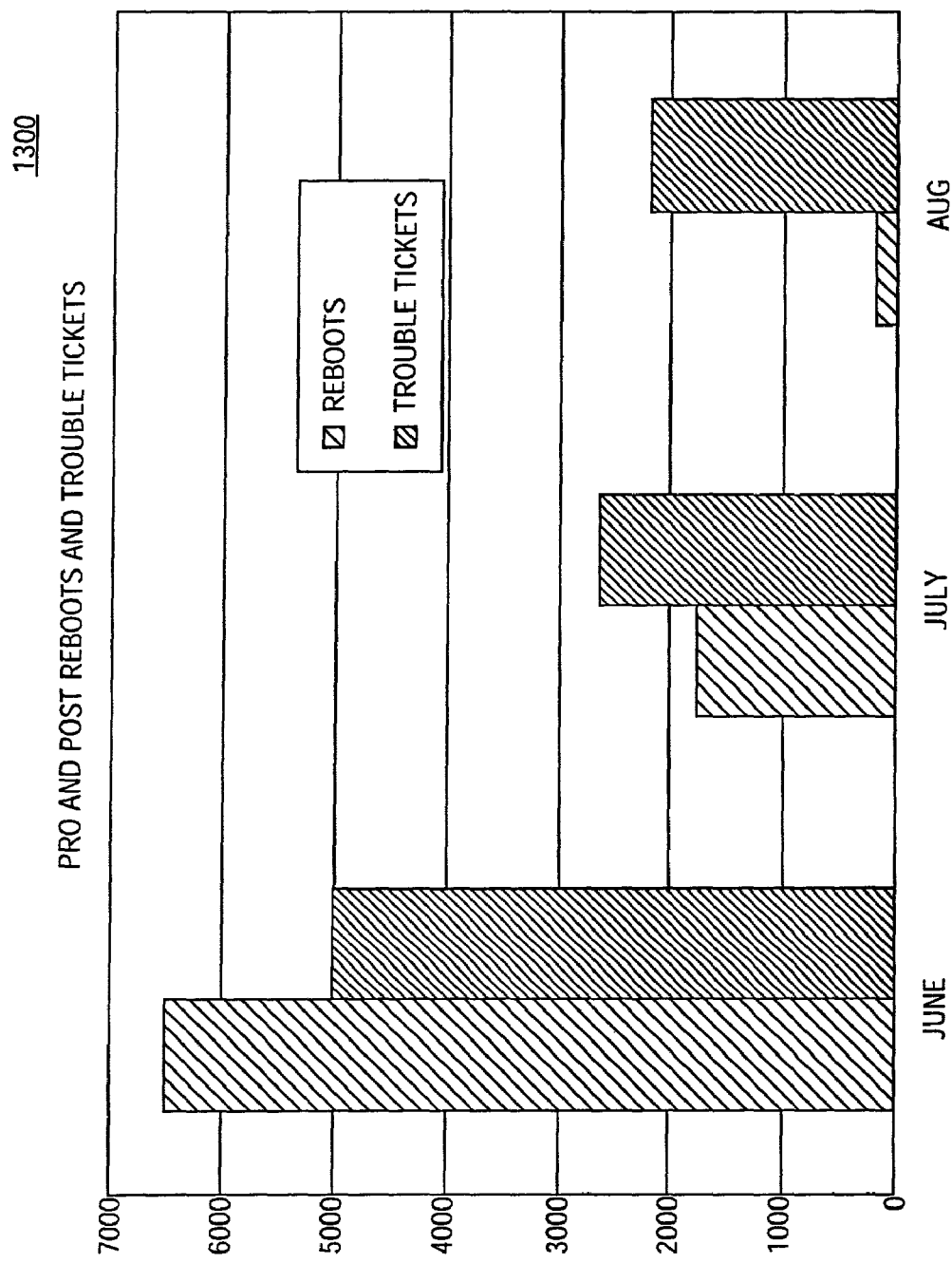

FIG. 13 is an illustration of an exemplary graphical report, Pre and Post Reboots and Trouble Tickets report 1300. Report 1300 indicates graphically a number of reboots a distributed system experienced over a predetermined period of time (e.g., monthly) and the number of trouble tickets generated during that same period of time. As shown, report 1300 indicates a drop in the number of reboots and trouble tickets from June to August.

Figure 14:
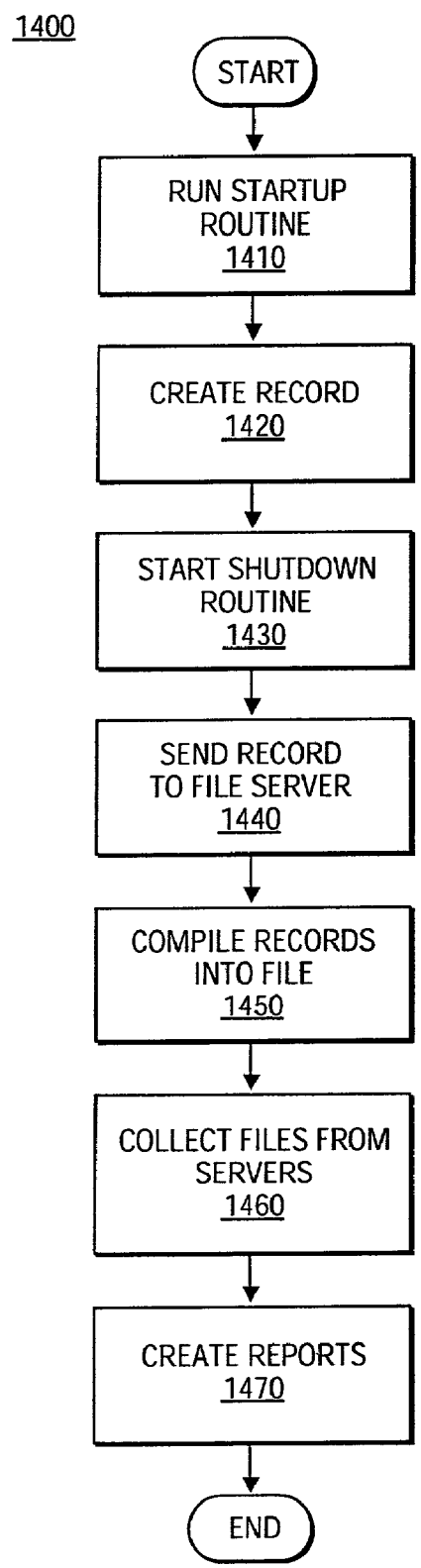
FIG. 14 is a flowchart of an exemplary method for providing a reboot tracker report consistent with certain features related to the present invention.

To better describe certain features consistent with the present invention, FIG. 14 shows a flowchart of a process that distributed system 100 or 200 may perform to provide a reboot tracker report consistent with the present invention. Initially, when a terminal (e.g., 110–118) is started, the start-up routine 150 included in the respective terminal is executed (step 1410). During execution, start-up routine 150 may determine whether a record is to be created based on predetermined criteria. For example, start-up routine 150 may be configured to generate a record each time the terminal 110–118 is started. Alternatively, routine 150 may be configured to generate a record periodically, such as every hour, every 8 hours, every 24 hours, etc. Thus, if terminal 110–118 shuts down and starts up several times during the predetermined period, routine 150 will not generate a record until the predetermined period has expired. The record, however, will reflect the shut down and start up events during that period. Once routine 150 determines a record is to be generated, routine 150 may execute processes that collect the information used to generate a record, such as the information included in exemplary record 700 shown in FIG. 7 (step 1420). Each record created by terminal 110–118 may be stored in memory 310 for subsequent use by terminal 110–118 and/or file server 210, 220.

Routine 150 may execute shutdown routine 410 (step 1430). In one embodiment of the invention, shut down routine 410 may, among other things, determine whether the shutdown is based on a normal or abnormal event (e.g., crash). At some point during execution of terminal 110–118, a shut down or crash event may occur. For example, a user operating terminal 110–118 may initiate a proper shut down procedure by activating a shut down program included in the terminal. Alternatively, the user may initiate an improper shut down procedure by simply turning off the terminal 110–118 without activating a shut down program. Further, terminal 110–118 may experience a fault or error that causes the terminal to either shut down properly or improperly.

Depending on whether terminal 110–118 experienced a normal or abnormal shutdown event, shut down routine 410 sets the reboot/crash flag accordingly. For instance, if terminal 110–118 experienced a proper shutdown event, routine 410 may set the flag to "1." Conversely, a crash event will not allow the shutdown routine to set the flag, so the flag will stay set at "0." In one embodiment of the invention, the start-up routine interrogates the flag and stores its value in memory for use in record 700 (e.g., field 745). Once the value of the flag has been stored, start-up routine 150 may reset the flag to "0." Accordingly, the value of the flag is always set to "0" when a terminal is operating. The shutdown routine may be configured to set the flag to "1" each time the routine is executed, which is during a normal shutdown. Accordingly, a terminal that experiences a normal shutdown event will have the flag set to "1" by the shutdown routine. This may be reflected in the record 700 sent to file server 210, 212.

However, if a terminal experiences shutdown event and the flag was not set to "1," this may reflect an abnormal shut down because the shut down routine did not set the flag to "1." Therefore, if a terminal stops running normally (for any reason) the flag will still be set to "0" when the machine is subsequently started. This indicates that the terminal did not invoke the normal OS shutdown routine the last time it was shutdown (i.e., it crashed).

Terminal 110–118 may be configured to provide record 700 to file server 210, 220 each time the record is generated (step 1440). Alternatively, following, or during, shutdown of terminal 110–118, the generated a local flag record. This record may be used by the start-up routine to generate a record that will be sent to a file server. Accordingly, file servers 210, 220 may be constantly updated with new records from corresponding terminals 110–118.

File server 210, 212 compiles all the records received from corresponding terminals 110–118 into a log file 800 (step 1450). Thus, log file 800 may include a collection of records provided from the terminals connected to the file server (e.g., file server 210 complies the records from terminals 110–114 into a log file and file server 212 compiles the records from terminals 116 and 118 into a corresponding log file). File server 210, 212 in a memory device, such as memory 310, maintains the log files. In one embodiment, log file 800 may be stored in a non-volatile memory device that is tolerant to power loss conditions. Alternatively, log file 800 may be kept in redundant memory storage devices to allow file server 210, 212 to recover any information that may be lost due to a fault or error condition.

Central sever 220 runs collection routine 240 to collect files from the file servers 210, 212 (step 1460). In certain embodiments, central server 220 on a periodic basis, such as hourly, weekly, monthly, etc may execute collection routine 240. Accordingly, collection routine 240 may direct server 220 to generate a request that is provided to file server 210, 212. In response, to the request, file server 210, 212 may create a response message that includes the information maintained in the log file 800. The log file 800 may be provided in the format generated by file server 210, 212, or may be provided in unformatted form. The response message may then be provided to central server 220. Once the log files 800 are received from the file servers 210, 212, collection routine 240 may store the log files in statistical database 610. The data stored in statistical database 610 may then be used by server 220 to create reports (e.g., reports 900–1300) indicating the health of the terminals monitored in the distributed system (step 1470). In one embodiment, the reports are generated using a combination of a Visual Basic front end and a statistical modelling and database tool.

Figure 15:
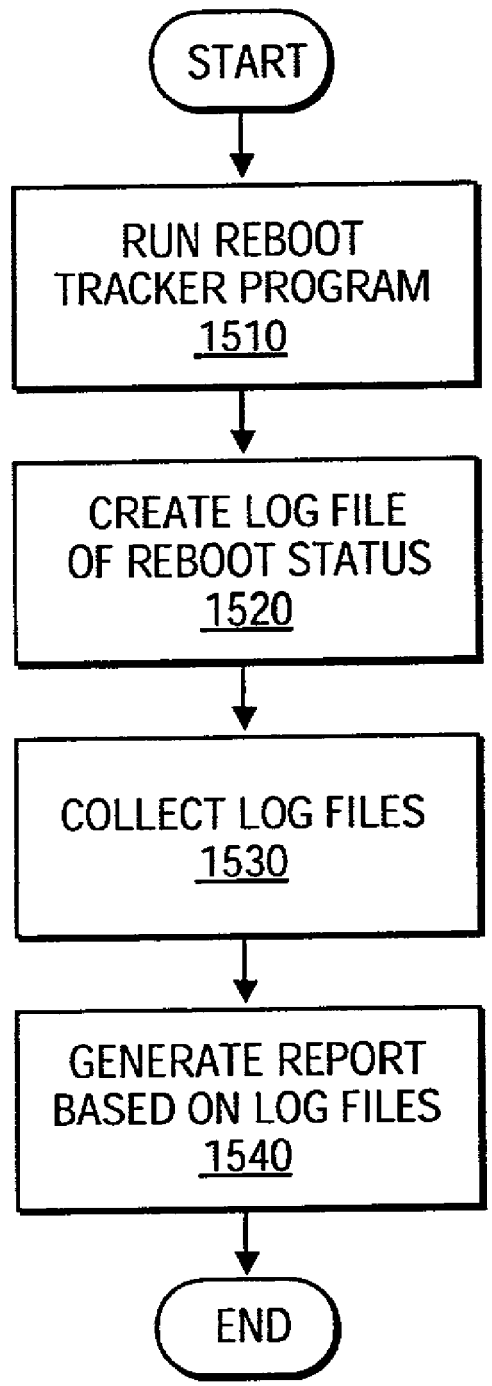
FIG. 15 is a flowchart of another exemplary method for providing a reboot tracker report consistent with certain features related to the present invention.

In another embodiment of the invention, system 100, 200 may perform a reboot tracking process to remotely monitor the reboot status of terminals 110–118. FIG. 15 shows a flowchart of an exemplary process for tracking the reboot status of terminals 110–118 consistent with the present invention. During operations, a terminal 110–118 may execute a reboot tracker program that is a process similar to start-up routine 150. That is, the reboot tracker program may also generate a record similar to record 700 in manner similar to the processes described with respect to steps 1410 and 1420 of FIG. 14. The reboot tracker record that is created by the reboot tracker program may include information reflecting the number of reboots the terminal experienced and crashes associated with the reboots. For instance, the reboot/crash flag 745 may be set by the reboot tracker program to an appropriate value (e.g., "0" or "1") based on a detected reboot condition.

Once a record is created, the reboot tracker program may provide the record to a file server 210, 212. The file server may then add the record to a log file that includes, among other information, a reboot status for each corresponding terminal that provided a record to the file server 210, 212 (step 1520). At some point, a collection routine operating on central server 220 may provide a request to the file server 210, 212 for the log file. In response to the request, the file server 210, 212 may provide the log file to central server 220, which in turn, is stored in a central memory file, such as statistical database 610 (step 1530). Accordingly, central server 220 may collect log files from a plurality of file servers 210, 220 and store them in a central storage location. Central server 220 may access the information stored in the central memory file to generate reports indicating a reboot status of the terminals 110–118 included in the distributed system monitored by central server (step 1540). In one embodiment of the invention, central server 220 may create a reboot status report that indicates the number of reboots, crashes, terminals in operation, etc., within a predetermined interval of time.

A user may access the reboot status reports provided by central server 220 to analyses the performance of the distributed system monitored by server 220. For example, based on the reboot status tracking reports, as well as the other reports generated by central server 220 (e.g., reports 900–1300), a user may determine when a remote terminal 110–118 experienced abnormal shut downs and crash events. Further, the user may obtain information from the reports that shows reboot and shutdown trends of selected users, terminals, operating systems, etc. For instance, a reboot status report may indicate that a certain user experiences an abnormal shut down 80% of the time the user is logged on to a terminal 110–118. This may reflect a trend that the user is not shutting down the terminal they are operating properly. Further, the reports may indicate that a certain terminal has experienced a high percentage of crashes over the past few weeks. Accordingly, central server 220 may provide information to a user, such as a system administrator, technical support personnel, network manager, etc., that enables technical support to be provided to an unhealthy terminal from a remote location. The data gathered may be used to look for trends, such as whether all the terminals at a particular site are crashing more than their counter parts at a different location.

Other embodiments of the invention will be apparent to those skilled in the art from consideration of the specification and practice of the invention disclosed herein. For example, the distributed system 100 shown in FIG. 1 may perform a modified report generating processes described with respect to FIGS. 14 and 15. For instance, server 130 may operate a collection routine that directs server 130 to receive the records generated by start-up routines 150 included in each terminal 110–114. Once collected, the records may be collected in a log file 800 and stored in a database where server 130 may generate reports reflecting the status of terminals 110–114, such as reports 900–1300.

In one embodiment, for example, file servers 210 and 212 may be configured to perform fault tolerant operations to maintain the log files for central server 220. For example, file server 210 may be configured to retrieve records from terminals 116 and 118 in the event file server 212 is inoperable. Further, server 212 may be configured to receive records from terminals 112–114 in the event server 210 is configured to be inoperable.

A business may use a trend report to help in the choice of computer systems. A user may receive the trend report. The trend report may show a number of system parts, including but not limited to including CPU speed, RAM, operating system, template build. The trend report, or a user viewing the trend report, may make a correlation between a particular system part or combination of system parts and increased system reboots. Based on the correlation, the user may recommend a new system part be used.

A business may use a trend report to help in the review of terminal user training. A manager may receive the trend report. The trend report may show data for a number of month, both before and after a training event. The report may include data for a number of terminal users. The manager may review the trend report for indications of improvement by terminal users after the training event. The manger may also review the trend report or the trend report may indicate if a particular terminal user has continued problems, even after a training event. The manager may request that the user attend another training event.

Further, a business may use the trend report to reduce costs generated by trouble tickets. An Information Technology ("IT") department at a business may receive trend reports for the terminal users at a business. The IT department may analyse the trend report. The analysis of the trend report may indicate that a particular department needs further training, a particular operating system causes higher then average problems, or other trends that indicate system problems. Based on the analysis of the trend report the IT department may implement a solution to the problem trend, such as adding training to a department or changing the operating system. Due to the pro-active changes the number of trouble tickets generated by a department operating costs are reduced, compared to not using the system.

Furthermore, although embodiments of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described embodiments, but instead is defined by the appended claims in light of their full scope of equivalents.

What is claimed is:

1. A reboot tracking system, comprising:
a start-up routine installed on at least one terminal, wherein the start-up routine is configured to create a record reflecting a reboot status associated with the at least one terminal;
a file server for receiving and storing the record in a log file from the at least one terminal; and
a central server for collecting the log file from the file server and storing the record in a database and for generating a reboot status report based on the record stored in the database;
wherein the record contains a reboot flag reflecting whether the at least one terminal experienced a normal or abnormal shut down; and
wherein the startup routine is further configured to execute a shutdown routine that sets the reboot flag when the respective terminal shuts down.

2. A method for remotely tracking a reboot status of a first terminal and a second terminal, comprising:
using a start-up routine to create a first reboot record at the first terminal including a first reboot status reflecting whether the first terminal experienced a reboot;
creating, at a file server remotely located from the first terminal, a log file that includes the first reboot record from the first terminal and a second reboot record from the second terminal remotely located from the file server, wherein the second terminal includes a second reboot status reflecting whether the second terminal experienced a reboot;
providing the log file to a central server remotely located from the first and second terminal and the file server; and generating a reboot status report that indicates the first reboot status for the first terminal and the second reboot status for the second terminal based on the provided log file;

wherein using a start-up routine to create a first reboot record includes:

determining whether the first terminal or the second terminal experienced an abnormal or normal shut down event; and providing a flag in the first reboot record or the second reboot record indicating whether the respective first terminal or the second terminal experienced an abnormal or normal shut down based on the determining step.

3. A method for remotely tracking a reboot status of a first terminal and a second terminal, comprising:

using a start-up routine to create a first reboot record at the first terminal including a first reboot status reflecting whether the first terminal experienced a reboot;

creating, at a file server remotely located from the first terminal, a log file that includes the first reboot record from the first terminal and a second reboot record from the second terminal remotely located from the file server, wherein the second terminal includes a second reboot status reflecting whether the second terminal experienced a reboot;

providing the log file to a central server remotely located from the first and second terminal and the file server; and generating a reboot status report that indicates the first reboot status for the first terminal and the second reboot status for the second terminal based on the provided log file;

wherein using a start-up routine to create a first reboot record includes:

determining whether the first terminal or the second terminal experienced an abnormal or normal shut down event; and providing a flag in the first reboot record or the second reboot record indicating whether the respective first terminal or the second terminal experienced an abnormal or normal shut down based on the determining step;

wherein determining whether the first terminal or second terminal experienced an abnormal or normal shut down event further includes:

determining whether the first terminal or the second terminal experienced an abnormal shut down condition based on whether an operating system executing in the respective first terminal or the second terminal received a shutdown command during shut down.

4. A system for remotely tracking reboot status comprising:

a first terminal configured to use a start-up routine to generate a first record including a first reboot status of the first terminal;

a second terminal configured to generate a second record including a second reboot status of the second terminal;

a first file server configured to generate a first log file from the first record;

a second file server configured to generate a second log file from the second record; and a central server for generating a reboot status report based on the first and second log files;

wherein the first terminal and the second terminal are configured to provide a flag in the respective first record and second record indicating whether the respective first terminal or second terminal experienced an abnormal or normal shut down; and wherein the first terminal and the second terminal are configured to provide the flag based on a determination of whether the respective first terminal and second terminal determines that an operating system executing in the respective first terminal and second terminal received a shutdown command during shut down.

5. A method for improving the choice of a computer system part, the method comprising:

receiving a trend report, wherein the trend report shows data for a number of computer system parts, including at least one of CPU speed, RAM, operating system, or template build;

making a correlation between a particular computer system part and increased computer system reboots, or combination of computer system parts and increased computer system reboots; and recommending a new computer system part based on the correlation between the computer system part and increased computer system reboots, or combination of computer system parts and the increased computer system reboots.

6. The method of claim 5, wherein the trend report is generated by creating a first reboot record at a first computer including a first reboot status reflecting whether the first computer experienced a reboot;

creating, at a file server remotely located from the computer, a log file that includes the first reboot record from the first computer and a second reboot record from a second computer remotely located from the file server, wherein the second computer includes a second reboot status reflecting whether the second computer experienced a reboot;

providing the log file to a central server remotely located from the first computer and the second computer and the file server; and generating a trend report based on the provided log file.

7. A method for improving user performance, the method comprising:

receiving a trend report, Wherein the trend report shows computer reboots for computers used by a users;

making a correlation between a particular user and higher then average number of computer reboots on a computer used by the particular user; and recommending additional computer training for the user based on the higher then average number of computer reboots for the user.

8. The method of claim 7, wherein the trend report is generated by:

creating a first reboot record at a first computer including a first reboot status reflecting whether the first computer experienced a reboot;

creating, at a file server remotely located from the computer, a log file that includes the first reboot record from the first computer and a second reboot record from a second computer remotely located from the file server, wherein the second computer includes a second reboot status reflecting whether the second computer experienced a reboot;

providing the log file to a central server remotely located from the first computer and the second computer and the file server; and generating a trend report based on the provided log file.

* * * * *

UNITED STATES PATENT AND TRADEMARK OFFICE
CERTIFICATE OF CORRECTION

| | | |
|---|---|---|
| PATENT NO. | : 7,017,085 B2 | Page 1 of 1 |
| APPLICATION NO. | : 10/159767 | |
| DATED | : March 21, 2006 | |
| INVENTOR(S) | : Richard A. Braun | |

It is certified that error appears in the above-identified patent and that said Letters Patent is hereby corrected as shown below:

Column 16,
Line 42, change "Wherein" to -- wherein --.
Line 43, change "users" to -- user --.
Lines 45 and 48, change "then" to -- than --.

Signed and Sealed this

Twenty-seventh Day of June, 2006

JON W. DUDAS
*Director of the United States Patent and Trademark Office*